United States Patent
Antoni et al.

(10) Patent No.: US 9,372,065 B2
(45) Date of Patent: Jun. 21, 2016

(54) COMBINED STEERING TORQUE-STEERING ANGLE SENSOR HAVING MAGNETIC FIELD SENSOR ELEMENTS

(75) Inventors: Henrik Antoni, Freigericht (DE); Heinrich Acker, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 43 days.

(21) Appl. No.: 14/240,193

(22) PCT Filed: Aug. 24, 2012

(86) PCT No.: PCT/EP2012/066496
§ 371 (c)(1),
(2), (4) Date: May 19, 2014

(87) PCT Pub. No.: WO2013/026921
PCT Pub. Date: Feb. 28, 2013

(65) Prior Publication Data
US 2014/0292315 A1    Oct. 2, 2014

(30) Foreign Application Priority Data
Aug. 24, 2011 (DE) .................. 10 2011 081 500

(51) Int. Cl.
*G01B 7/30* (2006.01)
*B62D 6/10* (2006.01)
(Continued)

(52) U.S. Cl.
CPC .. *G01B 7/30* (2013.01); *B62D 6/10* (2013.01); *B62D 15/0215* (2013.01); *G01D 5/2452* (2013.01); *G01L 3/104* (2013.01)

(58) Field of Classification Search
CPC ...... B62D 6/10; B62D 15/0215; G01L 3/104; G01D 5/2452; G01B 7/30

USPC ................ 324/207.25, 207.2, 207.21, 207.12
See application file for complete search history.

(56) References Cited

U.S. PATENT DOCUMENTS

| 4,984,474 | A | * | 1/1991 | Matsushima | ........... G01L 5/221 324/207.14 |
|---|---|---|---|---|---|
| 2004/0004471 | A1 | | 1/2004 | Haas | |

(Continued)

FOREIGN PATENT DOCUMENTS

| CN | 102099663 | 6/2011 |
|---|---|---|
| DE | 102004004025 | 10/2004 |

(Continued)

OTHER PUBLICATIONS

Machine English translation of the detailed description of DE 102004004025, obtained from the EPO website, obtained on Oct. 1, 2012.

(Continued)

*Primary Examiner* — Jay Patidar
(74) *Attorney, Agent, or Firm* — RatnerPrestia

(57) ABSTRACT

A steering torque-steering angle sensor comprising a steering torque sensor module and a steering angle sensor module, wherein the steering torque sensor module operates with a magnetic effective principle and has in this respect a first magnetic encoder and at least one first magnetic field sensor element, wherein the steering angle sensor module has at least a second magnetic field sensor element and a third magnetic field sensor element, wherein the second magnetic field sensor element directly or indirectly senses the magnetic field of the first magnetic encoder, that is to say of the magnetic encoder of the steering torque sensor module, and wherein the third magnetic field sensor element senses the magnetic field of an additional, second magnetic encoder.

10 Claims, 2 Drawing Sheets

Figure 1:
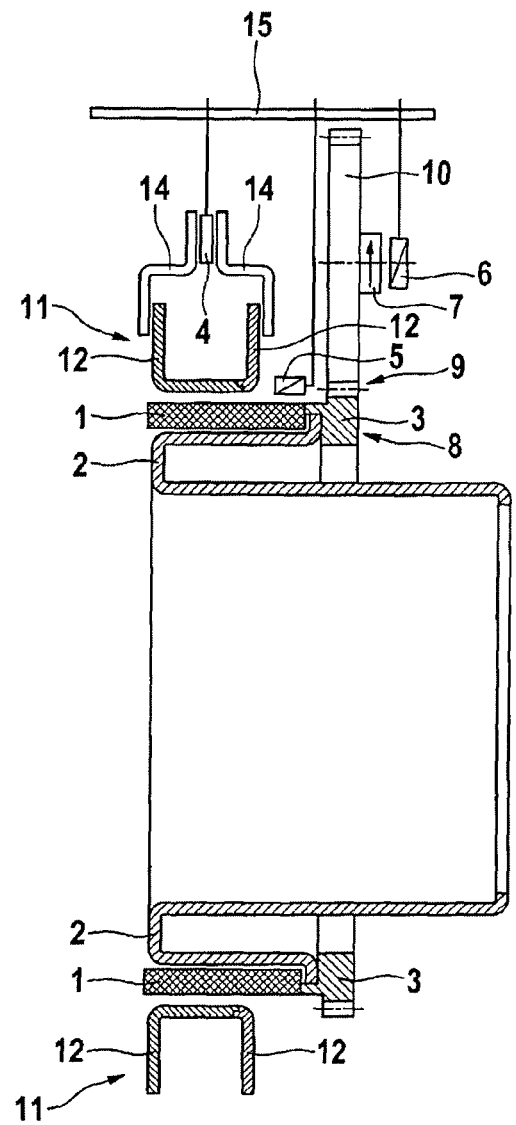
Figure 2:
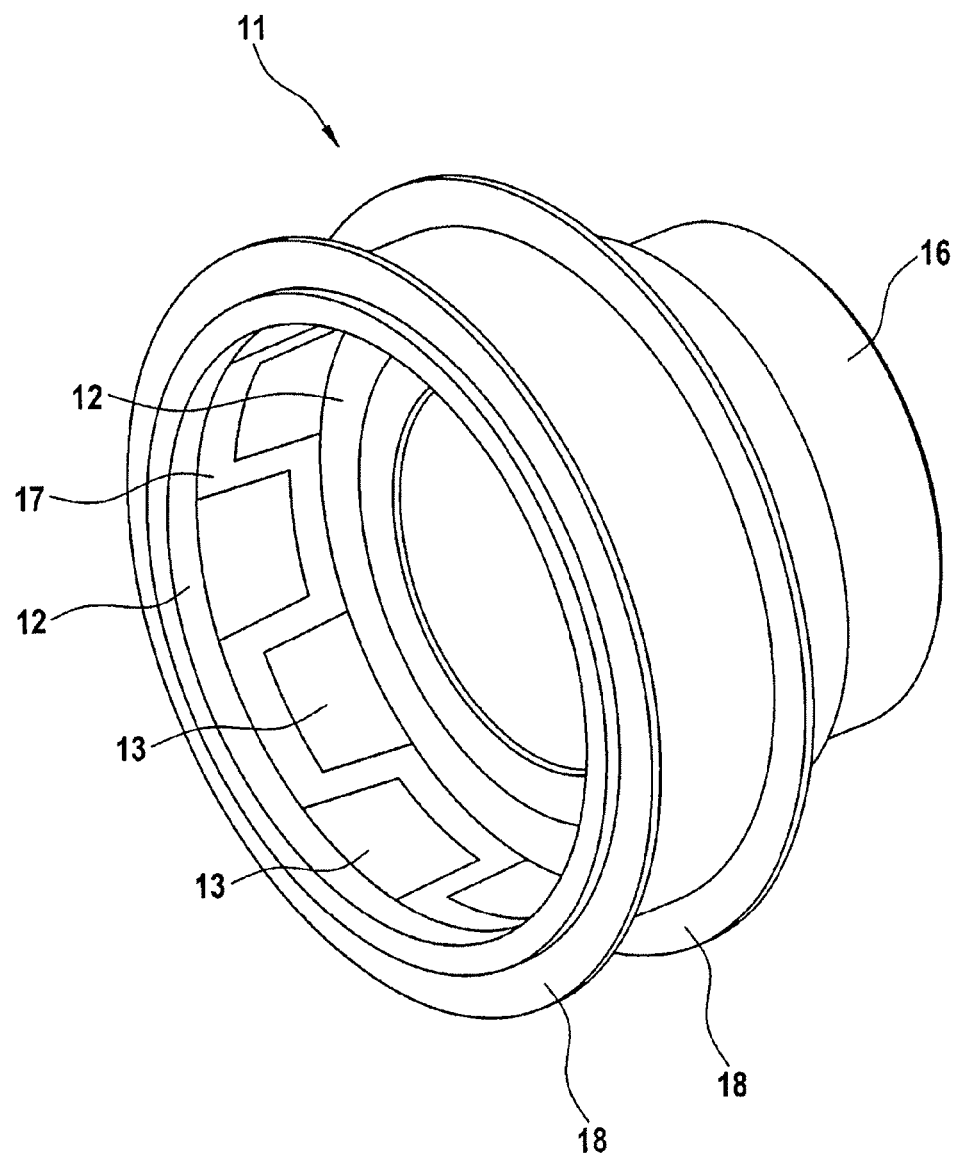

(51) Int. Cl.
  *B62D 15/02* (2006.01)
  *G01L 3/10* (2006.01)
  *G01D 5/245* (2006.01)

(56) References Cited

U.S. PATENT DOCUMENTS

| | | |
|---|---|---|
| 2004/0007663 A1 | 1/2004 | Steinlechner |
| 2004/0015307 A1 | 1/2004 | Heisenberg |
| 2005/0127902 A1 | 6/2005 | Sogge |
| 2006/0028204 A1 | 2/2006 | Oohira |
| 2006/0123903 A1 | 6/2006 | Gandel et al. |
| 2008/0250873 A1 | 10/2008 | Prudham et al. |
| 2010/0301845 A1 | 12/2010 | Acker |
| 2010/0313681 A1 | 12/2010 | Goll et al. |
| 2011/0167920 A1 | 7/2011 | Rink |

FOREIGN PATENT DOCUMENTS

| | | |
|---|---|---|
| DE | 602 00 499 T2 | 5/2005 |
| DE | 10 2004 023 801 A1 | 8/2005 |
| DE | 102004011125 | 9/2005 |
| DE | 10 2007 059 361 A1 | 9/2008 |
| DE | 10 2008 059 775 A1 | 6/2009 |
| EP | 1074818 | 2/2001 |
| EP | 1 818 659 A1 | 8/2007 |
| EP | 2 314 498 A2 | 4/2011 |
| EP | 2 314 499 A1 | 4/2011 |
| FR | 2 872 896 A1 | 1/2006 |
| WO | 2010007068 | 1/2010 |
| WO | WO 2011 062 431 A2 | 5/2011 |
| WO | WO 2011 062 438 A2 | 5/2011 |

OTHER PUBLICATIONS

Z.Q. Zhu and D. Howe, "Halbach Permanent Magnet Machines and Applications: A Review", IEE Proc.—Electr. Power Appl., Vo. 148, No. 4, Jul. 2001.
Entire patent prosecution history of U.S. Appl. No. 12/745,066, filed May 27, 2010, entitled, "Absolute Measurement Steering Angle Sensor Arrangement Having Multiple Magnetic Encoders."
International Search Report corresponding to PCT/EP2012/066496 dated Nov. 14, 2012.
Non-Final Office Action mailed May 26, 2015 in U.S. Appl. No. 12/745,066.

\* cited by examiner

US 9,372,065 B2

COMBINED STEERING TORQUE-STEERING ANGLE SENSOR HAVING MAGNETIC FIELD SENSOR ELEMENTS

CROSS REFERENCE TO RELATED APPLICATION

This application is the U.S. National Phase Application of PCT International Application No. PCT/EP2012/066496, filed Aug. 24, 2012, which claims priority to German Patent Application No. 10 2011 081 500.7, filed Aug. 24, 2011, the contents of such applications being incorporated by reference herein.

FIELD OF THE INVENTION

The invention relates to a steering torque-steering angle sensor comprising a steering torque sensor module and a steering angle sensor module, wherein the steering torque sensor module operates with a magnetic principle of operation and thereby compromises a first magnetic encoder and at least one first magnetic field sensor element or a combined steering torque-steering angle sensor and the use of the steering torque-steering angle sensor in the steering system of a motor vehicle.

BACKGROUND OF THE INVENTION

A torque sensor is known from document FR 2872896 A1, which is incorporated by reference, that records the difference angle across a torsion rod or its deflection. With this the displacement of a radially magnetized multipole permanent magnet as an encoder is measured relative to a flux conducting toothed ring as a stator. Depending on the relative angular position between the magnetic encoder and the stator, a magnetic flux is influenced and is measured by means of a Hall probe. A combination of steering angle and torque sensor is known from DE 102004023801, which is incorporated by reference, but is cost-intensive and requires additional components.

SUMMARY OF THE INVENTION

An aspect of the invention proposes a steering torque-steering angle sensor that is inexpensive and/or in compact form.

This is achieved according to an aspect of the invention by a steering torque-steering angle sensor comprising a steering torque sensor module and a steering angle sensor module, wherein the steering torque sensor module operates with a magnetic principle of operation and thereby comprises a first magnetic encoder and at least one first magnetic field sensor element, wherein the steering angle sensor module comprises at least one second magnetic field sensor element and a third sensor element, wherein the second magnetic field sensor element directly or indirectly records the magnetic field of the first magnetic encoder of the steering torque sensor module, and wherein the third sensor element records a second encoder.

The second encoder is preferably in the form of a magnetic encoder and the third sensor element is in the form of a magnetic field sensor element, which records the magnetic field of the second magnetic encoder. Alternatively, the second encoder and the third sensor element are preferably designed according to an inductive or capacitive measurement principle.

It is preferable that the first magnetic encoder is disposed on a first rotatable shaft section having a gear section, especially in the form of outer circumferential teeth, with which the first shaft section with the first magnetic encoder forms a first gear wheel.

It is advantageous that the first magnetic encoder is joined to the first shaft section by means of a connecting element, especially an injection molding. Said connecting element is thereby particularly preferably part of the first gear wheel.

The second magnetic encoder is preferably disposed on a second gear wheel or alternatively preferably integrated within the second gear wheel, wherein the second gear wheel is engaged with the first gear wheel.

It is preferable that the steering torque sensor module for measurement of a torque acting on a shaft is designed such that the shaft comprises a first shaft section and a second shaft section and said two shaft sections can twist relative to each other, wherein the first magnetic encoder is disposed on the first shaft section and a stator is disposed on the second shaft section, wherein the stator comprises two stator elements, each with projecting fingers, wherein the fingers of the two stator elements intermesh contactlessly, and a flux concentrator that is associated especially individually or commonly with the stator elements delivers the magnetic field to be recorded and which is generated by the first magnetic encoder directly or indirectly to at least the first magnetic field sensor element.

The fingers of the two stator elements are advantageously formed to project axially relative to the shaft. The stator elements are thereby especially designed such that the fingers are of uniform size and equidistantly disposed on an essentially circular line. Particularly preferably, the fingers each narrow or become narrower from their roots to their tips, very particularly preferably with a trapezoidal outline.

It is preferred that the steering angle sensor module is designed such that it records the steering angle using the Nonius principle.

It is advantageous that the steering angle sensor module for measurement of the angle of rotation of the shaft with a defined angle of rotation measurement range, especially of more than 360°, is designed such that the first gear wheel and the first magnetic encoder, having at least one encoder track comprising a plurality of pairs of poles, rotate with the shaft, wherein the second gear wheel rotates together with the magnetic encoder and the first and the second gear wheels are engaged with each other, wherein for angle recording the second magnetic field sensor element is associated with the first magnetic encoder and the third magnetic field sensor element is associated with the second magnetic encoder, wherein the first and second gear wheels are designed with respect to their common ratio and the first and second magnetic encoders are designed with respect to the number of poles such that a magnetic field sensor element associated with the first or second magnetic encoder with respect to angle recording detects n poles or pairs of poles in relation to the entire angle of rotation measurement range of the angle sensor arrangement and the magnetic field sensor element associated with the second or first magnetic encoder with respect to angle recording detects n−1+Δ poles or pairs of poles in relation to the entire angle of rotation measurement range of the angle sensor arrangement, wherein Δ is defined as a real number between 0 and 1 and n is defined as a natural number.

It is preferred that the first and the second gear wheels are designed with respect to their common gear ratio and the first and second magnetic encoders are designed with respect to their numbers of poles/pairs of poles such that Δ is assigned a value greater than 0 and less than 0.5, especially a value greater than 0 and less than 0.04.

The first and second gear wheels are preferably both in the form of gear wheels.

It is preferred that the first gear wheel and the connecting element of the first magnetic encoder are combined into one component.

The first and second magnetic encoders each preferably comprise at least one permanent magnetic and magnetized encoder track, which comprises alternating magnetized magnetic poles, which are particularly preferably essentially disposed on a circular line.

Preferably, absolute angle information is computed from the information or output signals of the magnetic field sensor elements using a Nonius algorithm or Nonius principle. For this purpose, the steering torque-steering angle sensor particularly preferably comprises a signal processing device.

It is advantageous that the second magnetic field sensor element for measurement is disposed on the first magnetic encoder in the radial or alternatively preferably the axial direction (at the end) before the first magnetic encoder.

A flux concentrator is preferably understood to mean a collector or a collector plate.

The first and the second shaft sections are preferably joined to each other by means of a torsion rod or are directly or indirectly coupled to each other and able to twist relative to each other.

Preferably, the two shaft sections are each in the form of sleeves attached to the shaft or to the torsion rod.

The stator elements and the at least one flux concentrator are advantageously at least partly made of soft magnetic material. The magnetic field produced by the first magnetic encoder thereby particularly preferably at least partly passes through the stator elements, which guide the magnetic flux.

A magnetic field sensor element is preferably understood to mean a magnetoelectric transducer element, preferably a Hall element or a magnetoresistive sensor element. Such a magnetic field sensor element especially comprises an electronic signal processing circuit.

The magnetic encoder is advantageously an encoder ring and especially in one piece and designed such that both stator elements are associated therewith. Alternatively, preferably the sensor arrangement comprises two or more magnetic encoders or encoder rings disposed on the first shaft section and adjacent to each other. The magnetic encoder is particularly preferably alternatingly magnetized or is a multipole encoder.

The stator elements each preferably comprise a radially projecting ring, especially projecting radially relative to the shaft sections. Each stator element thereby has an associated flux concentrator or there is a common flux concentrator. Particularly preferably, the flux concentrator is coupled to the two rings of the stator elements, in each case by an air gap, and is designed such that it takes in the magnetic field or the corresponding magnetic flux deflected by the stator and feeds it to the first magnetic field sensor element.

It is preferable that the first magnetic encoder is designed as a multipole encoder and the second magnetic encoder is designed as a dipole encoder.

The first and second gear wheels are advantageously designed in respect of their common gear ratio and the first and second magnetic encoders are advantageously designed in respect of their numbers of poles or pairs of poles such that n has an associated value between 8 and 60, and especially a value between 14 and 40.

A stator is preferably understood to mean a magnetic flux conducting sender that is advantageously statically disposed on one of the two shaft sections and associated with the first magnetic encoder. The stator is thereby alternatively preferably designed such that it is disposed so as to be rotationally displaceable.

The stator and the optional flux concentrator are advantageously made of soft magnetic material. The invention also relates to the use of the steering torque-steering angle sensor in a steering system of a motor vehicle.

REFERENCE CHARACTER LIST

1 first magnetic encoder
2 first shaft section or supporting sleeve
3 connecting element (incl. gear wheel implementation)
4 first magnetic field sensor element (steering torque sensor module)
5 second magnetic field sensor element (steering angle sensor module)
6 third magnetic field sensor element (steering angle sensor module)
7 second magnetic encoder
8 first gear wheel
9 circumferential teeth of the first shaft section
10 second gear wheel
11 stator
12 two stator elements
13 fingers of the stator elements
14 flux concentrator
15 circuit board or PCB ("Printed Circuit Board")
16 second shaft section
17 stator element connecting element
18 rings of the stator elements

The invention claimed is:

1. A steering torque-steering angle sensor comprising a steering torque sensor module and a steering angle sensor module, wherein the steering torque sensor module comprises a first magnetic encoder and at least one first magnetic field sensor element, wherein the steering angle sensor module comprises at least one second magnetic field sensor element and a third sensor element, wherein the second magnetic field sensor element senses the magnetic field of the first magnetic encoder of the steering torque sensor module, wherein the third sensor element senses a magnetic field generated by a second encoder, wherein the steering angle sensor module has a defined angle of rotation measurement range of more than 360°, and wherein the first and second magnetic encoders are designed in respect of their numbers of poles such that the second magnetic field sensor element associated with the first magnetic encoder in relation to angle recording detects n poles or pairs of poles over an entire angle of rotation measurement range of the angle sensor arrangement and the third magnetic field sensor element associated with the second magnetic encoder detects $n-1+\Delta$ poles or pairs of poles over the entire angle of rotation measurement range of the angle sensor arrangement, wherein $\Delta$ is defined as a real number between 0 and 1 and n is defined as a natural number.

2. The steering torque-steering angle sensor as claimed in claim 1, wherein the second encoder is in the form of a magnetic encoder and the third sensor element is in the form of a magnetic field sensor element that records the magnetic field of the second magnetic encoder.

3. The steering torque-steering angle sensor as claimed in claim 1, wherein the first magnetic encoder is disposed on a first rotatable shaft section, which comprises outer circumferential teeth, with which the first shaft section with the first magnetic encoder forms a first gear wheel.

4. The steering torque-steering angle sensor as claimed in claim 3, wherein the second encoder is disposed on a second gear wheel that is engaged with the first gear wheel.

5. The steering torque-steering angle sensor as claimed in claim 3, wherein the first magnetic encoder is connected to the first shaft section by an injection molded connecting element.

6. The steering torque-steering angle sensor as claimed in 5, wherein said connecting element is part of the first gear wheel.

7. The steering torque-steering angle sensor as claimed in claim 1, wherein the steering angle sensor module is designed such that it senses the steering angle using the Nonius principle.

8. The steering torque-steering angle sensor as claimed in claim 1, wherein the first and the second gear wheels are designed in respect of their common transmission ratio and the first and second magnetic encoders are designed in respect of their numbers of poles/pairs of poles such that $\Delta$ has an associated value greater than 0 and less than 0.5.

9. The steering torque-steering angle sensor as claimed in claim 1, wherein the first and the second gear wheels are designed in respect of their common transmission ratio and the first and second magnetic encoders are designed in respect of their numbers of poles/pairs of poles such that $\Delta$ has an associated value greater than 0 and less than 0.04.

10. A steering torque-steering angle sensor comprising:
a first module comprising:
  a first magnetic encoder; and
  at least one first magnetic field sensor element positioned to sense a magnetic field generated by the first magnetic encoder; and
a second module comprising:
  a second magnetic encoder
  at least one second magnetic field sensor element positioned to sense a magnetic field generated by the first magnetic encoder; and
  at least one third magnetic field sensor element positioned to sense a magnetic field generated by the second magnetic encoder,
wherein the second module has a defined angle of rotation measurement range of more than 360°, and
wherein the first and second magnetic encoders are designed in respect of their numbers of poles such that the second magnetic field sensor element associated with the first magnetic encoder in relation to angle recording detects n poles or pairs of poles over an entire angle of rotation measurement range of the angle sensor arrangement and the third magnetic field sensor element associated with the second magnetic encoder detects n−1+$\Delta$ poles or pairs of poles over the entire angle of rotation measurement range of the angle sensor arrangement, wherein $\Delta$ is defined as a real number between 0 and 1 and n is defined as a natural number.

* * * * *